United States Patent
Frenkel et al.

(10) Patent No.: US 8,635,441 B2
(45) Date of Patent: Jan. 21, 2014

(54) ENCRYPTION-BASED CONTROL OF NETWORK TRAFFIC

(75) Inventors: Lior Frenkel, Moshav Misgav Dov (IL); Amir Zilberstein, Yad Rambam (IL)

(73) Assignee: Waterfall Security Solutions Ltd., Rosh Ha'ayin (IL)

( * ) Notice: Subject to any disclaimer, the term of this patent is extended or adjusted under 35 U.S.C. 154(b) by 879 days.

(21) Appl. No.: 12/438,548

(22) PCT Filed: Aug. 29, 2007

(86) PCT No.: PCT/IL2007/001070
§ 371 (c)(1), (2), (4) Date: Feb. 24, 2009

(87) PCT Pub. No.: WO2008/026212
PCT Pub. Date: Mar. 6, 2008

(65) Prior Publication Data
US 2009/0319773 A1    Dec. 24, 2009

(30) Foreign Application Priority Data
Aug. 29, 2006 (IL) .......................... 177756

(51) Int. Cl.
*H04L 29/06* (2006.01)
(52) U.S. Cl.
USPC ........................................................ 713/153
(58) Field of Classification Search
USPC ......................................................... 713/153
See application file for complete search history.

(56) References Cited

U.S. PATENT DOCUMENTS

| | | | |
|---|---|---|---|
| 4,985,919 A | | 1/1991 | Naruse et al. |
| 4,987,595 A | | 1/1991 | Marino, Jr. et al. |
| 5,530,758 A | | 6/1996 | Marino, Jr. et al. |
| 5,548,646 A | * | 8/1996 | Aziz et al. ..................... 713/153 |
| 5,677,952 A | | 10/1997 | Blakley et al. |
| 5,696,822 A | * | 12/1997 | Nachenberg ..................... 726/24 |
| 5,732,278 A | | 3/1998 | Furber et al. |
| 5,835,726 A | | 11/1998 | Shwed et al. |
| 5,940,507 A | | 8/1999 | Cane et al. |
| 5,946,399 A | | 8/1999 | Kitaj et al. |

(Continued)

FOREIGN PATENT DOCUMENTS

| | | |
|---|---|---|
| EP | 1632833 A2 | 3/2006 |
| GB | 2371125 A | 7/2002 |

(Continued)

OTHER PUBLICATIONS

Bruce Schneier, Applied Cryptography, 1996, John Wiley & Sons Inc., Second Edition, p. 173.*

(Continued)

*Primary Examiner* — Benjamin Lanier
(74) *Attorney, Agent, or Firm* — D. Kligler I.P. Services Ltd.

(57) ABSTRACT

A computer-implemented method for protecting a computer network (22) includes receiving at a gateway (24) data transmitted from a source address for delivery to a destination on the computer network. The data are encrypted at the gateway using an encryption key selected from a set of one or more keys that are not available to the source address. The encrypted data are transmitted over the computer network toward the destination. The transmitted encrypted data are received and decrypted for use at the destination by means of one of the keys in the set.

23 Claims, 3 Drawing Sheets

(56) References Cited

U.S. PATENT DOCUMENTS

| | | | |
|---|---|---|---|
| 5,995,628 A | 11/1999 | Kitaj et al. | |
| 6,023,570 A | 2/2000 | Tang et al. | |
| 6,049,611 A | 4/2000 | Tatebayashi et al. | |
| 6,240,514 B1* | 5/2001 | Inoue et al. | 713/153 |
| 6,289,377 B1 | 9/2001 | Lalwaney et al. | |
| 6,317,831 B1 | 11/2001 | King | |
| 6,470,449 B1 | 10/2002 | Blandford | |
| 6,574,640 B1 | 6/2003 | Stahl | |
| 6,601,126 B1 | 7/2003 | Zaidi et al. | |
| 6,615,244 B1 | 9/2003 | Singhal | |
| 6,643,701 B1 | 11/2003 | Aziz et al. | |
| 6,738,388 B1 | 5/2004 | Stevenson et al. | |
| 6,915,435 B1 | 7/2005 | Merriam | |
| 6,931,549 B1 | 8/2005 | Ananda | |
| 6,957,330 B1 | 10/2005 | Hughes | |
| 6,963,817 B2 | 11/2005 | Ito et al. | |
| 6,966,001 B2 | 11/2005 | Obara et al. | |
| 6,970,183 B1 | 11/2005 | Monroe | |
| 6,986,061 B1 | 1/2006 | Kunzinger | |
| 7,031,322 B1 | 4/2006 | Matsuo | |
| 7,062,587 B2 | 6/2006 | Zaidi et al. | |
| 7,143,289 B2* | 11/2006 | Denning et al. | 713/168 |
| 7,171,566 B2 | 1/2007 | Durrant | |
| 7,200,693 B2 | 4/2007 | Jeddeloh | |
| 7,254,663 B2 | 8/2007 | Bartley et al. | |
| 7,260,833 B1 | 8/2007 | Schaeffer | |
| 7,324,515 B1 | 1/2008 | Chapman | |
| 7,366,894 B1* | 4/2008 | Kalimuthu et al. | 713/153 |
| 7,631,189 B2* | 12/2009 | Ichinose et al. | 713/176 |
| 7,660,959 B2 | 2/2010 | Asher et al. | |
| 7,675,867 B1 | 3/2010 | Mraz et al. | |
| 7,685,636 B2* | 3/2010 | Leake et al. | 726/20 |
| 7,698,470 B2 | 4/2010 | Ruckerbauer et al. | |
| 7,716,467 B1* | 5/2010 | Deffet et al. | 713/153 |
| 7,757,074 B2* | 7/2010 | Sundarrajan et al. | 713/151 |
| 7,761,704 B2 | 7/2010 | Ho et al. | |
| 7,814,316 B1 | 10/2010 | Hughes et al. | |
| 7,815,548 B2 | 10/2010 | Barre et al. | |
| 7,845,011 B2 | 11/2010 | Hirai | |
| 7,849,330 B2 | 12/2010 | Osaki | |
| 8,041,832 B2 | 10/2011 | Hughes et al. | |
| 8,046,443 B2 | 10/2011 | Parker et al. | |
| 2001/0033332 A1 | 10/2001 | Kato et al. | |
| 2002/0065775 A1 | 5/2002 | Monaghan | |
| 2002/0066018 A1* | 5/2002 | Linnartz | 713/171 |
| 2002/0114453 A1* | 8/2002 | Bartholet et al. | 380/44 |
| 2002/0178370 A1* | 11/2002 | Gurevich et al. | 713/189 |
| 2002/0191866 A1 | 12/2002 | Tanabe | |
| 2002/0199181 A1 | 12/2002 | Allen | |
| 2003/0037247 A1 | 2/2003 | Obara et al. | |
| 2003/0055792 A1* | 3/2003 | Kinoshita et al. | 705/67 |
| 2003/0061505 A1* | 3/2003 | Sperry et al. | 713/200 |
| 2003/0114204 A1 | 6/2003 | Allen et al. | |
| 2003/0140239 A1 | 7/2003 | Kuroiwa et al. | |
| 2003/0159029 A1* | 8/2003 | Brown et al. | 713/151 |
| 2003/0188102 A1 | 10/2003 | Nagasoe et al. | |
| 2003/0217262 A1 | 11/2003 | Kawai et al. | |
| 2004/0022107 A1 | 2/2004 | Zaidi et al. | |
| 2004/0070620 A1 | 4/2004 | Fujisawa | |
| 2004/0071311 A1 | 4/2004 | Choi et al. | |
| 2004/0080615 A1 | 4/2004 | Klein et al. | |
| 2004/0175123 A1 | 9/2004 | Lim et al. | |
| 2004/0217890 A1 | 11/2004 | Woodward et al. | |
| 2004/0247308 A1 | 12/2004 | Kawade | |
| 2005/0015624 A1 | 1/2005 | Ginter et al. | |
| 2005/0033990 A1 | 2/2005 | Harvey et al. | |
| 2005/0085964 A1 | 4/2005 | Knapp et al. | |
| 2005/0091173 A1* | 4/2005 | Alve | 705/71 |
| 2005/0119967 A1 | 6/2005 | Ishiguro et al. | |
| 2005/0120251 A1 | 6/2005 | Fukumori et al. | |
| 2005/0138369 A1* | 6/2005 | Lebovitz et al. | 713/163 |
| 2005/0264415 A1 | 12/2005 | Katz | |
| 2006/0047887 A1 | 3/2006 | Jeddeloh | |
| 2006/0064550 A1 | 3/2006 | Katsuragi et al. | |
| 2006/0085354 A1 | 4/2006 | Hirai | |
| 2006/0085534 A1 | 4/2006 | Ralston et al. | |
| 2006/0095629 A1 | 5/2006 | Gower et al. | |
| 2006/0136724 A1* | 6/2006 | Takeshima et al. | 713/168 |
| 2006/0179208 A1 | 8/2006 | Jeddeloh | |
| 2006/0220903 A1 | 10/2006 | Zigdon et al. | |
| 2006/0248582 A1 | 11/2006 | Panjwani et al. | |
| 2006/0259431 A1 | 11/2006 | Poisner | |
| 2006/0271617 A1 | 11/2006 | Hughes et al. | |
| 2007/0028027 A1 | 2/2007 | Janzen et al. | |
| 2007/0028134 A1 | 2/2007 | Gammel et al. | |
| 2007/0043769 A1 | 2/2007 | Kasahara et al. | |
| 2007/0055814 A1 | 3/2007 | Jeddeloh | |
| 2007/0063866 A1 | 3/2007 | Webb | |
| 2007/0112863 A1 | 5/2007 | Niwata et al. | |
| 2007/0203970 A1 | 8/2007 | Nguyen | |
| 2007/0283297 A1 | 12/2007 | Hein et al. | |
| 2008/0066192 A1 | 3/2008 | Greco et al. | |
| 2008/0082835 A1 | 4/2008 | Asher et al. | |
| 2008/0155273 A1 | 6/2008 | Conti | |
| 2009/0002150 A1 | 1/2009 | Zilberstein et al. | |
| 2009/0019325 A1 | 1/2009 | Miyamoto et al. | |
| 2011/0213990 A1 | 9/2011 | Poisner | |

FOREIGN PATENT DOCUMENTS

| | | |
|---|---|---|
| WO | 01/63879 A1 | 8/2001 |
| WO | 2008001344 A2 | 1/2008 |
| WO | 2008026212 A2 | 3/2008 |
| WO | 2008087640 A2 | 7/2008 |
| WO | 2009004611 A2 | 1/2009 |
| WO | 2009053990 A2 | 4/2009 |

OTHER PUBLICATIONS

Bruce Schneier, Applied Cryptography, 1996, John Wiley & Sons, Inc., Second Edition, p. 32.*

Bruce Schneier, Applied Cryptography, 1996, John Wiley & Sons, Inc., Second Edition, pp. 357-358.*

Israel Patent Application # 201473 Official Action dated May 8, 2011.

U.S. Appl. No. 11/977,391 Official Action dated Jun. 14, 2011.

Frenkel, L., "Unidirectional Information Transfer", Web issue, Jun. 2005.

U.S. Appl. No. 12/447,470 Official Action dated Sep. 14, 2011.

U.S. Appl. No. 12/306,692 Official Action dated Sep. 28, 2011.

U.S. Appl. No. 12/447,470 Official Action dated Mar. 25, 2011.

U.S. Appl. No. 12/447,470 Official Action dated Feb. 9, 2012.

U.S. Appl. No. 12/306,692 Official Action dated Feb. 13, 2012.

European Patent Application # 07805530.8 Search report dated Mar. 6, 2012.

EP Patent Application # 08702651.4 Search report dated May 11, 2012.

U.S. Appl. No. 12/447,470 Official Action dated Aug. 30, 2012.

U.S. Appl. No. 13/487,265, filed Jun. 4, 2012.

Israel Patent Application # 177,756 Office Action dated Oct. 24, 2012.

Federal Information Processing Standards Publication 46-2 (FIPS 46-2), "Data Encryption Standard (DES)", Dec. 30, 1993.

IL Patent Application # 177,756 Official Action dated Aug. 17, 2010.

IL Patent Application # 180,748 Official Action dated Oct. 25, 2010.

Einey, D., "Waterfall IP Surveillance Enalber", Jul. 2007.

Waterfall Security Solutions Ltd., "Waterfall One Way Link Technology", 2008 http://www.waterfall-solutions.com/home/Waterfall_Technology.aspx.

Multi-State Information Sharing Analysis Center (MSISAC), "Cyber Security Procurement Language for Control Systems", version 1.8, revision 3, Feb. 2008 http://www.msisac.org/scada/documents/4march08scadaprocure.pdf.

International Application PCT/IL2008/000886 Search Report dated Nov. 13, 2008.

International Application PCT/IL2008/000070 Search Report dated Jun. 16, 2008.

(56) References Cited

OTHER PUBLICATIONS

International Application PCT/IL2007/001070 Search Report dated Jul. 25, 2008.
Axis Communications., "Axis Network Cameras", 2008 http://www.axis.com/products/video/camera/index.htm.
International Application PCT/IL2006/001499 Search Report dated Apr. 8, 2008.
International Application PCT/IL2006/001499 Patentability Report dated Mar. 19, 2009.
International Application PCT/IL2007/001070 Patentability Report dated Mar. 16, 2009.
International Application PCT/IL2008/001513 Search Report dated Mar. 10, 2009.
Check Point Software Technologies Ltd., "Extended Unified Threat Management capabilities with new multi-layer messaging security deliver best all-inclusive security solution", USA, Nov. 18, 2008 http://www.checkpoint.com/press/2008/utm-1-edge-upgrade-111808.html.
Innominate Security Technologies, "Press Release: Innominate joins Industrial Defender Enabled Partner Program", Germany, Apr. 14, 2008 http://www.innominate.com/content/view/288/120/lang,en/.
U.S. Appl. No. 11/823,950 Official Action dated Jun. 22, 2009.

* cited by examiner

ENCRYPTION-BASED CONTROL OF NETWORK TRAFFIC

FIELD OF THE INVENTION

The present invention relates generally to data communication systems, and specifically to systems and methods for preventing attacks on computers in a network by malicious communication traffic.

BACKGROUND OF THE INVENTION

Data encryption is widely used in preventing unauthorized access to data. Various methods of data encryption are known in the art. In general, these methods use a key to convert data to a form that is unintelligible to a reader (human or machine), and require an appropriate key in order to decrypt the data. Symmetric encryption methods use the same key for both encryption and decryption. Such symmetric methods include the well-known DES (Data Encryption Standard) and AES (Advanced Encryption Standard) algorithms, as well as simpler methods, which are sometimes referred to as "scrambling."

In asymmetric encryption methods, such as the RSA (Rivest Shamir Adelman) algorithm, a computer that is to receive encrypted data generates complementary public and private keys and transmits the public key to the sender. After the sender has encrypted the data using the public key, only the holder of the private key can decrypt it.

SUMMARY OF THE INVENTION

Embodiments of the present invention use data encryption techniques to protect a network (including computers on the network) from malicious data transmissions. Such malicious transmissions may contain program code, such as computer viruses and worms in the guise of protocol headers or payload data, for example, that is intended to infect switches, hosts, and other nodes in the network. In other cases, malicious transmissions may contain confidential data, extracted surreptitiously from a computer by a Trojan horse program or a human intruder. When data transmissions that are directed to or from the protected network are encrypted, these sorts of program code and data are scrambled and are thus rendered harmless until they are decrypted. Decryption may be controlled so as to neutralize the malicious effects of the transmission.

In some embodiments of the present invention, a gateway is used to encrypt transmissions to destinations within a protected network from sources outside the protected network. If sources of malicious transmissions were to know in advance the key that is used in encrypting data transmission within the network, these source could prepare their transmissions in such a way as to have malicious effect after encoding. In order to prevent this eventuality, the gateway at the ingress to the protected network uses an encryption key that is not available to the source. For example, the gateway may choose keys using a pseudo-random process for encrypting incoming data transmissions. The gateway then transmits the encrypted data over the protected network to a designated receiver, where the data are then decrypted and "sterilized." Optionally, the key may be transmitted to the receiver over the protected network, as well, either together with the data or separated from the data by a selected time interval. In some embodiments, the gateway performs the steps of choosing the key, encrypting the data, and transmitting the encrypted data and key automatically, without intervention of a human operator.

In other embodiments of the present invention, a gateway encrypts transmissions from sources within a protected network to destinations outside the protected network. The gateway encrypts the data with a key that is not initially available to the source or to the receiving computer at the destination of the transmission. The gateway transmits the key to the receiving computer only upon receiving confirmation that the transmission from the source was authorized. This confirmation may be in the form, for example, of a digital signature belonging to an authorized user or authorized software application, which is appended to the data transmitted to the gateway from the source. The gateway checks the validity of the digital signature (or other confirmation), and only then transmits the key that the receiving computer will need in order to decrypt the data. Thus, even if a malicious user or program is successful in making an unauthorized transmission of data, the recipient of the transmission will be unable to decrypt and use the data.

There is therefore provided, in accordance with an embodiment of the present invention, a computer-implemented method for protecting a computer network, including:

receiving at a gateway data transmitted from a source address for delivery to a destination on the computer network;

encrypting the data at the gateway using an encryption key selected from a set of one or more keys that are not available to the source address;

transmitting the encrypted data over the computer network toward the destination; and receiving the transmitted encrypted data, and decrypting the data for use at the destination by means of one of the keys in the set.

Typically, encrypting and transmitting the data are performed automatically, without intervention by a human operator.

In a disclosed embodiment, receiving the data includes receiving the data from a public network, and wherein transmitting the encrypted data includes conveying the encrypted data over a private network.

In some embodiments, receiving the data includes receiving a data packet including a header and a payload, and encrypting the data includes encrypting both the header and the payload. Typically, conveying the encrypted data includes encapsulating the encrypted header and payload in another packet for transmission over the computer network.

In some embodiments, the method includes conveying to a receiver a decryption key suitable for decrypting the data for use at the destination. The encryption key may be selected using a pseudo-random process. Additionally or alternatively, conveying the decryption key may include transmitting the decryption key to the receiver over the computer network, wherein transmitting the decryption key and the encrypted data includes conveying the decryption key together with at least a portion of the encrypted data together over the computer network, possibly in a single data packet. Alternatively, transmitting the decryption key includes waiting for a selected delay period between transmitting the encrypted data and transmitting the decryption key to the receiver.

In a disclosed embodiment, the method includes, upon decrypting the data, checking the data for malicious content. Decrypting the data may include separately decrypting each of a sequence of segments of the encrypted data, and checking the data may include verifying each segment in the sequence to ensure that the segment does not contain the malicious content before proceeding to decrypt succeeding segments in the sequence.

There is also provided, in accordance with an embodiment of the present invention, a computer-implemented method for protecting a computer network, including:

receiving a first data packet, including a header and a payload, transmitted from a source address for delivery to a destination on the computer network;

encrypting at least the header of the first data packet, thereby generating an encrypted data packet;

encapsulating the encrypted data packet in a second data packet, and transmitting the second data packet over the computer network toward the destination; and receiving and processing the transmitted second data packet so as to decapsulate and decrypt the first data packet for use at the destination.

In a disclosed embodiment, encapsulating the encrypted data includes conveying a key for use in decrypting the data together with the encrypted data packet in the second data packet. The method may include, upon decrypting the first data packet, checking at least one part of the data packet, selected from among the header and the payload, for malicious content.

There is additionally provided, in accordance with an embodiment of the present invention, a computer-implemented method for protecting against malicious traffic, including:

receiving over a computer network a data packet including encrypted data for delivery to a destination on the computer network;

sequentially decrypting each of a sequence of segments of the encrypted data; and after decrypting each of the segments, verifying each segment to ensure that the segment does not contain malicious content before proceeding to decrypt a succeeding segment in the sequence.

There is further provided, in accordance with an embodiment of the present invention, apparatus for protecting a computer network, including:

a gateway, which is configured to receive data transmitted from a source address for delivery to a destination on the computer network, and to encrypt the data using an encryption key selected from a set of one or more keys that are not available to the source address, encrypting the data using the key, and to transmit the encrypted data over the computer network toward the destination; and a receiver, which is configured to receive the transmitted encrypted data, and to decrypt the data for use at the destination by means of one of the keys in the set.

There is moreover provided, in accordance with an embodiment of the present invention, apparatus for protecting a computer network, including:

a gateway, which is configured to receive a first data packet, including a header and a payload, transmitted from a source address for delivery to a destination on the computer network, to encrypt at least the header of the first data packet, thereby generating an encrypted data packet, and to encapsulate the encrypted data packet in a second data packet, and transmitting the second data packet over the computer network toward the destination; and a receiver, which is configured to receive and process the transmitted second data packet so as to decapsulate and decrypt the first data packet for use at the destination.

There is furthermore provided, in accordance with an embodiment of the present invention, a computer software product, including a computer-readable medium in which program instructions are stored, which instructions, when read by a computer, cause the computer to receive over a computer network a data packet including encrypted data for delivery to a destination on the computer network, and to sequentially decrypt each of a sequence of segments of the encrypted data, and after decrypting each of the segments, to verify each segment to ensure that the segment does not contain malicious content before proceeding to decrypt a succeeding segment in the sequence.

There is also provided, in accordance with an embodiment of the present invention, a computer-implemented method for protecting data, including:

receiving at a gateway data transmitted from a source within a protected computer network for delivery to a destination outside the protected computer network;

encrypting the data at the gateway using an encryption key selected from a set of one or more keys that are not available to the source or to the destination prior to receiving the data at the gateway;

transmitting the encrypted data to the destination;

receiving at the gateway a confirmation of an authorization to transmit the data from the source; and responsively to the confirmation, conveying a decryption key suitable for decrypting the data to the destination.

In one embodiment, receiving the confirmation includes receiving an electronic signature transmitted from the source. Alternatively or additionally, transmitting the encrypted data includes transmitting the encrypted data over a one-way link from the gateway to destinations outside the protected computer network. Typically, encrypting and transmitting the data are performed automatically, without intervention by a human operator. The protected computer network may be a private network, and transmitting the encrypted data may include conveying the encrypted data over a public network.

In some embodiments, receiving the data includes receiving a data packet including a header and a payload, and encrypting the data includes encrypting both the header and the payload, wherein conveying the encrypted data includes encapsulating the encrypted header and payload in another packet for transmission to the destination. Additionally or alternatively, encrypting the data includes selecting the encryption key using a pseudo-random process. Further additionally or alternatively, conveying the decryption key includes transmitting the decryption key to the destination after transmitting the encrypted data.

There is additionally provided, in accordance with an embodiment of the present invention, apparatus for protecting data, including:

a source computer, which is configured to be deployed in a protected computer network and to generate data for delivery to a destination outside the protected computer network; and a gateway, which is coupled to receive and encrypt the data from the source computer using an encryption key selected from a set of one or more keys that are not available to the source computer or to the destination prior to receiving the data at the gateway, to transmit the encrypted data to the destination, to receive a confirmation of an authorization to transmit the data from the source, and responsively to the confirmation, to convey a decryption key suitable for decrypting the data at the destination.

The present invention will be more fully understood from the following detailed description of the embodiments thereof, taken together with the drawings in which:

DETAILED DESCRIPTION OF EMBODIMENTS

Figure 1:
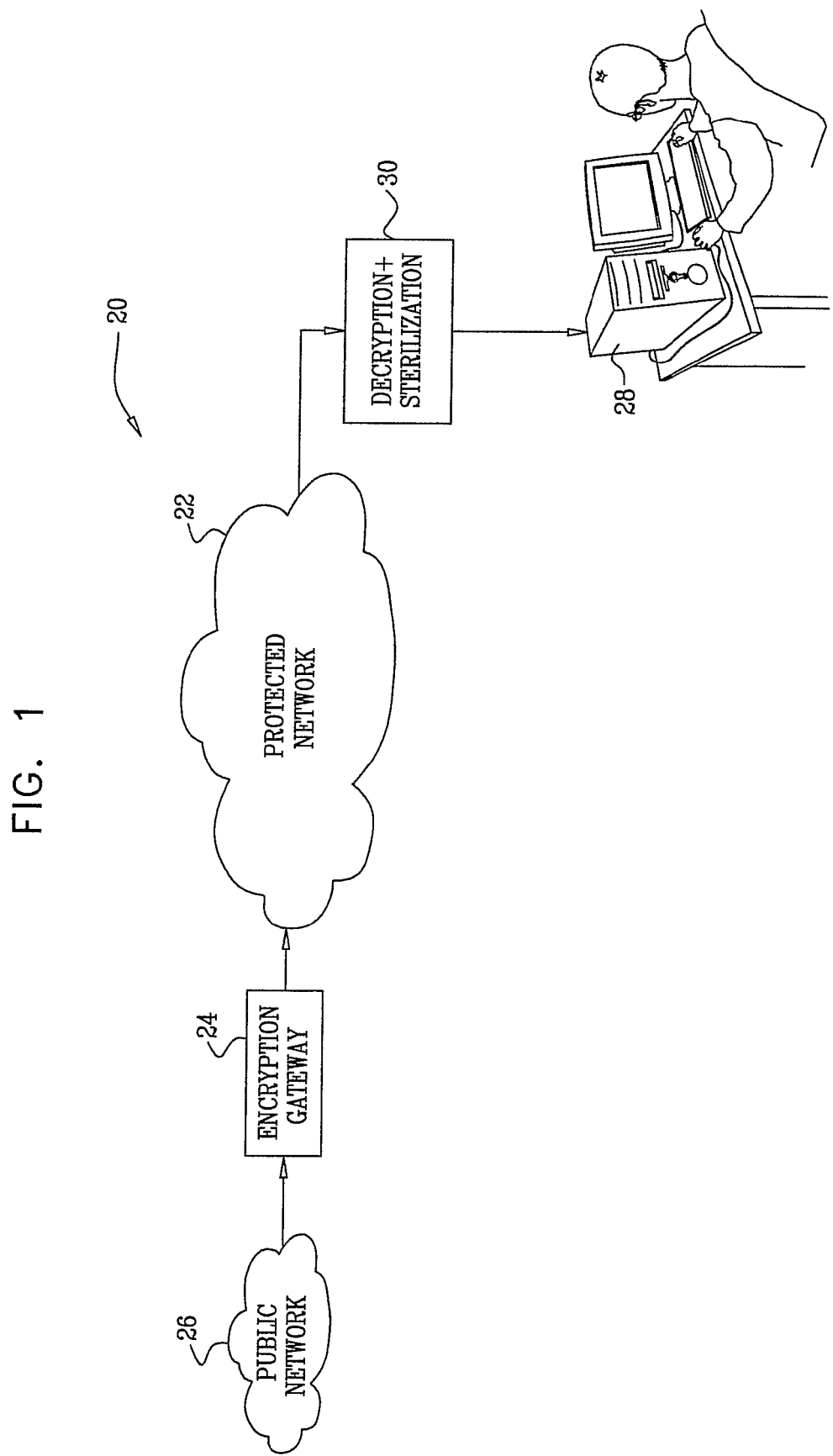
FIG. 1 is a block diagram that schematically illustrates a protected computer network, in accordance with an embodiment of the present invention.

FIG. 1 is a block diagram that schematically illustrates a system 20 for protecting a communication network 22 from malicious traffic, in accordance with an embodiment of the present invention. Typically, network 22 is a controlled, private network, such as a campus or enterprise network, or a secure virtual private network (VPN). In the configuration shown in FIG. 1, an encryption gateway 24 receives and encrypts incoming data traffic destined for addresses on network 22 from a public network 26, such as the Internet. The term "data traffic," as used herein, refers to any and all sorts of data that may be transmitted over networks 22 and 26, and may thus comprise not only payload data, but also packet headers and signaling traffic, for example. Gateway 24 encrypts the traffic, as described hereinbelow, and then transmits the traffic in encrypted form toward the appropriate destination. In the example shown in FIG. 1, the destination is a client computer 28.

Before delivery of the data to the appropriate application on computer 28, the data are decrypted and "sterilized" by a data receiver 30. Receiver 30 may reside on a server or it may alternatively be a function of computer 28. To decrypt the data, receiver 30 typically uses a key that is provided by gateway 24 and transmitted to the receiver over network 22, as described hereinbelow. After decryption, the receiver sterilizes the data in order to detect and neutralize any malicious content, such as viruses, worms and spyware, for example. Again, this "content" may be found in any part of the transmitted traffic, including not only payloads, but also protocol headers and signaling.

Because the traffic is transmitted through network 22 in encrypted form, the malicious content is scrambled and therefore cannot affect elements of network 22 that it traverses between gateway 24 and receiver 30. Although the sterilization functions of receiver 30 could be performed at the ingress to network 22 (where gateway 24 is located), the system configuration shown in FIG. 1 permits these functions to be distributed among multiple receivers and thus permits thorough and systematic sterilization without creating a bottleneck at the network ingress. Furthermore, if the sterilization process at receiver 30 fails to detect and block an item of malicious content, the consequences will probably be limited to computer 28 (and possibly other computers in its immediate vicinity), rather than spreading through the entire network as might occur if the malicious content were transmitted through network 22 unencrypted.

System 20 may operate over substantially any sort of networks and communication links. For example, although the embodiments described herein relate mainly to packet networks and packet data traffic, the principles of the present invention are similarly applicable to communication networks of other types, such as circuit-switched networks. The communication links in system 20 may be wired or wireless, synchronous or asynchronous, and they may be either unidirectional or bidirectional. Gateway 24 may be configured to operate in conjunction with any of these link types. In addition, the gateway may perform its protection function bidirectionally, encrypting both incoming data directed to computer 28 and outgoing data transmitted by computer 28 to other networks, for example. Furthermore, although the embodiments described herein refer to encryption of transmissions to computer 28, the encrypted traffic may be directed to any sort of destination on network 22, such as to a storage device, rather than a client computer. (In the case of a storage device, the data may be stored in the encrypted form generated by gateway 24, and then decrypted and sterilized only subsequently, possibly only when the data are actually needed.)

Gateway 24 and receiver 30 may each comprise either dedicated hardware or a general-purpose, software-driven computer processor, or a combination of hardware and software elements. For rapid encryption, as well as enhanced security, for example, the gateway may comprise one or more gate arrays with suitable firmware and/or an application-specific integrated circuit (ASIC). If a general-purpose computer processor is used, the software for carrying out the functions described herein may be downloaded to the processor over a network, or it may be alternatively provided on tangible media, such as optical, magnetic, or electronic memory media. In either case, once the operator of system 22 has configured gateway 24 and receiver 30 to communicate with one another and perform their respective functions, the gateway and receiver will typically carry out these functions on each packet that they transmit and receive without further human intervention. Alternatively, in some cases, a human operator may be more closely involved in running the gateway.

Figure 2:
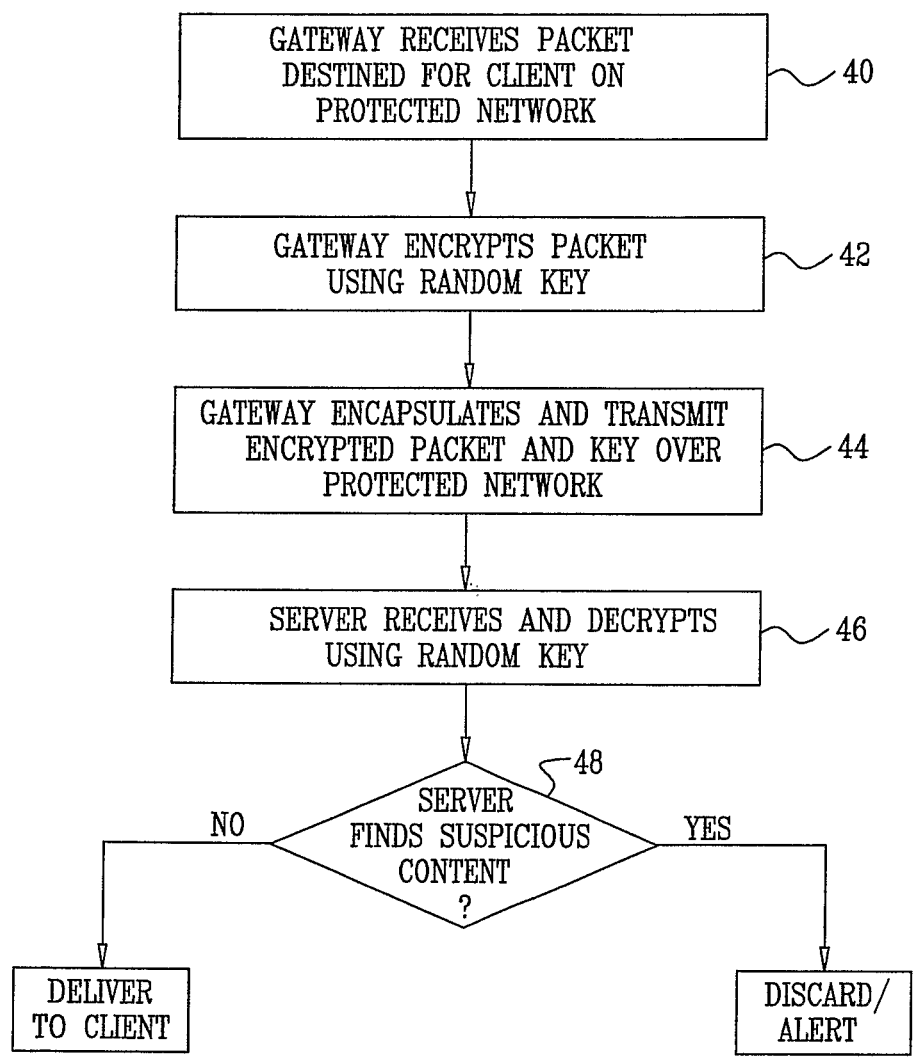
FIG. 2 is a flow chart that schematically illustrates a method for processing network traffic, in accordance with an embodiment of the present invention.

FIG. 2 is a flow chart that schematically illustrates a method for processing network traffic, in accordance with an embodiment of the present invention. For convenience and clarity, the method is described with reference to elements of system 20 (FIG. 1), but the method may alternatively be implemented, mutatis mutandis, in other sorts of data communication systems, as noted above. The method is initiated when gateway 24 receives a packet from network 26 that is directed to a destination on protected network 22, such as client computer 28. Gateway 24 may be configured to intercept and process all incoming traffic to network 22. Alternatively, the gateway may be programmed to intercept certain types of traffic or to intercept traffic selectively to certain destination addresses and/or at certain times or using certain protocols.

Gateway 24 automatically chooses a key to encrypt the data packet, at an encryption step 42. Typically, the gateway chooses the key using a pseudo-random process. The key may be chosen by selection from a list that was prepared in advance, or it may be chosen by pseudo-random generation at the time the data packet is received. (Alternatively, the key may be chosen deterministically, as long as it is not known or available to the sending computer.) The key may be of any suitable length, depending on the encryption algorithm that is used, but in general, even mild encryption using a short key (sometimes referred to as "scrambling") is sufficient for the purposes of the present method. If an asymmetric encryption algorithm is used, as described in the Background of the Invention, the gateway chooses both a public key for use in encrypting the data packet and a corresponding private key for subsequent decryption. Otherwise, for symmetric encryption, the encryption and decryption keys are the same.

Typically, gateway 24 encrypts the entire data packet, including both the payload and protocol headers. An advantage of this approach is that it prevents protocol-level attacks on switches and other nodes in network 22 that the packet traverses, as well as protocol-level attacks on the operating systems or application programs of hosts in network 22 (including both kernel and user modes). Only the receiver and destination computer (client 28 in this example) may be subject to a protocol attack after the packet is decrypted, but this possibility may be mitigated by careful sterilization in receiver 30.

Alternatively, for computational efficiency, gateway 24 may encrypt only parts of the packet that are vulnerable to attack. For example, the gateway may encrypt one or more of the protocol headers, while leaving others unencrypted. Alternatively or additionally, the gateway may encrypt the payload data or certain parts of the payload data. Further alternatively or additionally, different parts of the packet (such as headers and payload) may be encrypted using different keys or encryption algorithms. Typically, even if the payload data were already encrypted by the sender on network 26 (as part of a secure transmission protocol, for example), gateway 24 will still add its own layer of encryption to the encrypted data.

In any case, as explained above, the encryption performed at step 42 modifies the content of the data packet in a manner that cannot be predicted by parties attempting to generate malicious traffic. The key is not available to the sending computer. Therefore, any malicious code in the headers or payload of the packet is scrambled and can have no effect on elements of network 22 until it has been decrypted.

After encrypting the data packet, gateway 24 encapsulates the encrypted packet inside another packet for transmission over network 22 to receiver 30, at an encapsulation step 44. (Encapsulation is typically needed since the original packet headers have been encrypted and therefore cannot be used for packet routing and transport. Alternatively, if certain headers, such as the Internet Protocol [IP] header, are not encrypted, encapsulation may be unnecessary.)

The gateway also transmits the decryption key to the receiver. For convenience in transmission and handling, this key may be encapsulated in the same packet as the corresponding encrypted packet. Alternatively, the key may be transmitted separately, either before or after transmission of the encrypted packet. The gateway may wait for a predetermined delay, which is typically known to the gateway and receiver 30, between transmission of the packet and the key. Further alternatively, the key may be conveyed to the receiver via another network or via other media.

Typically, gateway 24 transmits the key to receiver 30 in the clear, without encryption. Clear transmission is possible since the purpose of the encryption is not to keep the contents of the data packet secret from other elements on network 22, but rather to scramble any potential malicious content, as noted above. On the other hand, if it is also desired to keep the contents of the data packet confidential during transmission over network 22, gateway 24 may also encrypt the key before transmission to receiver 30. For example, the gateway may encrypt the key using a public key provided by the receiver. Upon receiving the encrypted key from the gateway, the receiver will then apply the corresponding private key in order to decrypt the key for use in decrypting the data packet.

Receiver 30 receives the encrypted, encapsulated packet from gateway 24, at a packet reception step 46. For simplicity, it is assumed here that receiver 30 is embodied in a server, although as noted above, the receiving function may also be performed by client 28 itself. The receiver decapsulates the encrypted packet and then applies the key that was transmitted by the gateway (after decrypting the key, if necessary) in order to decrypt the packet.

Upon decrypting the packet, receiver 30 "sterilizes" the packet by checking the packet headers and payload for content that is suspected of being malicious, at a content checking step 48. Any suitable method known in the art may be used to identify such suspicious content. For example, receiver 30 may check the content against signatures of known malicious programs, such as viruses and worms. As another example, the receiver may check the packet for anomalies in the protocol fields or data content, which may indicate that the packet is of malicious origin.

The receiver may decrypt the entire packet at once at step 46, and may then check the entire packet at step 48. It may be safer, however, to carry out the decryption gradually, using a technique of "window decryption," in accordance with an embodiment of the present invention. In window decryption, the receiver decrypts small segments of the packet header and/or data, and then analyzes the segments, one at a time, for sterilization. The segments may be discrete or partly overlapping. This gradual method decreases the likelihood that malicious code will infect the receiver itself. This window decryption technique may also be used in other environments and applications in which encrypted traffic is checked for malicious content before delivery to a computer or application program that is to use the content.

If receiver 30 finds suspicious content at step 48, it does not pass the packet to client computer 28, but rather issues an alert (to the user of the computer and/or the system operator and/or to an automated monitoring system) to indicate that it has received a suspect packet. Depending on system configuration, the receiver may simply discard the packet, or it may give the user or system operator the opportunity to check the packet contents under safe conditions, and decide whether to accept or discard the packet. Otherwise, if the receiver finds nothing suspicious about the packet, it simply passes the packet on to the client computer for normal application-level processing.

Figure 3:
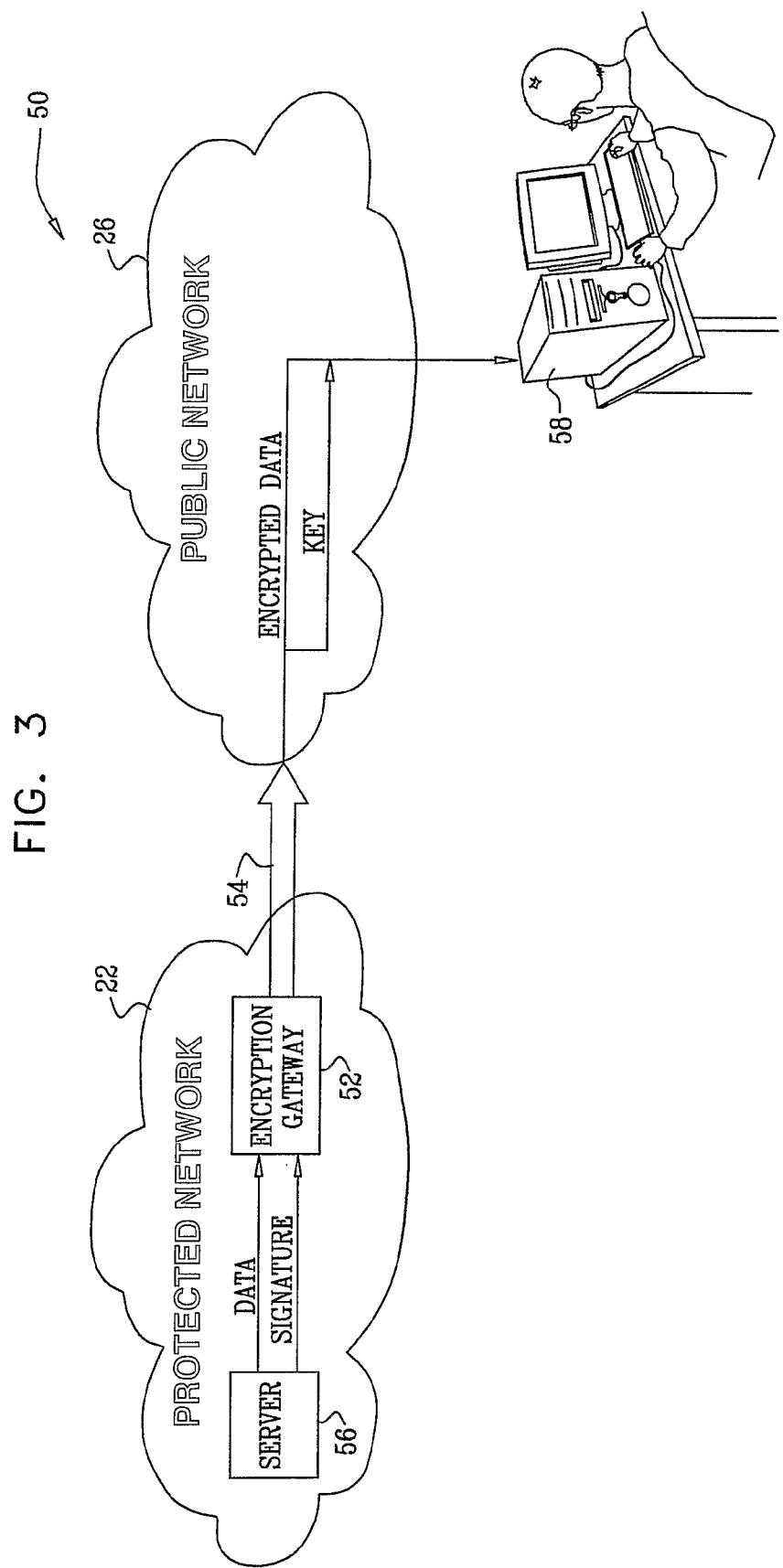
FIG. 3 is a block diagram that schematically illustrates a protected computer network, in accordance with another embodiment of the present invention.

FIG. 3 is a block diagram that schematically illustrates a system 50 for protecting communication network 22 from unauthorized transmissions of data out of the network, in accordance with an embodiment of the present invention. In this embodiment, a gateway 52 encrypts data traffic before the traffic is transmitted out of network 22 into a public network 26. The functions of gateway 52 and gateway 24 may be combined in a single machine, as noted earlier. Alternatively, network 22 may have separate encryption gateways for incoming (gateway 24) and outgoing (gateway 52) traffic. In either case, the properties and features of gateway 24 that are described above are applicable, mutatis mutandis, to gateway 52, as well.

In the example shown in FIG. 3, gateway 52 receives data from a computer in network 22, such as a server 56, for transmission to a destination computer 58 on network 26. For reasons of security, network 22 may be arranged so that outgoing traffic may exit the network only through gateway 52. Furthermore, gateway 52 may be connected to public network 26 via a one-way link 54, i.e., a communication link that is physically configured to carry signals in one direction and to be incapable of carrying signals in the opposite direction. One-way links may be implemented, for example, using Waterfall™ systems, manufactured by Gita Technologies, Ltd. (Rosh HaAyin, Israel), which provide a physical one-way connection based on fiberoptic communication. The one-way link makes it impossible for a hacker outside network 22 to tamper with gateway 52 (or with other computers in network 22 via the gateway, assuming there is no other ingress to network 22).

In operation of system 50, server 56 prepares data for transmission to destination computer 58 and passes the data to gateway 52. Gateway 52 encrypts the data using a suitable encryption algorithm, which may be symmetric or asymmetric. For the purposes of encryption, the gateway selects a suitable key, by random selection or by other methods of key selection that are described above. In general, the encryption key that is used to encrypt the data (as well as the corresponding decryption key) is not known in advance to either server 56 or destination 58. Even if the data transmitted by server 56 is already encrypted, gateway 52 adds its own layer of encryption, as explained above in regard to gateway 24.

Gateway 52 sends the encrypted data over link 54 to destination computer 58. To reduce transmission latency and memory requirements at gateway 52, the gateway may begin to encrypt and transmit the data as soon as it starts to receive the data stream from server 56. As noted above in reference to gateway 24, gateway 52 may encrypt all or part of the data, and may also encrypt protocol headers of data packets transmitted by server 56. The gateway may encapsulate the data transmitted by server 56 (including both payloads and headers of data packets) inside other data packets, with suitable (non-encrypted) headers for transmission over network 26. Other features of the encryption and transmission procedures described above in reference to gateway 24 may likewise be applied by gateway 52.

Without the necessary decryption key, computer 58 is unable to do anything with the encrypted data that it receives other than to store it. Therefore, even if a user of computer 58 was able to cause server 56 to send the data without the proper authorization, this user will be unable to read the data. The unauthorized transmission in such cases might have been engendered by a user of server 56, either maliciously or inadvertently, or by autonomous operation of a Trojan horse or other malicious code that was loaded into the server. In any case, as long as the egress from network 22 to network 26 is controlled by gateway 52, the data received by computer 58 will be encrypted.

Gateway 52 sends the necessary decryption key to computer 58 only after receiving confirmation that the transmission of data to this computer was properly authorized. The confirmation may have the form of a digital signature, which server 56 transmits to gateway 52 in the course of or at the end of the data transmission. The digital signature may be generated using any suitable means and method known in the art. For example, server 56 may generate and transmit the digital signature based on a secret code contained in a smart card or other medium that an authorized user couples to server 56 when the data are to be transmitted. The gateway verifies the authenticity of the digital signature before sending the decryption key to computer 58. Alternatively, the authorization may be provided automatically by a suitable, secure application or utility running on server 56, or may be invoked by other user-controlled procedures.

Upon receiving the confirmation, gateway 52 conveys the decryption key to computer 58. The key may be transmitted over network 26, typically in encrypted form. For example, gateway 52 may be preconfigured with a public key of computer 58 (and possibly with respective public keys of other computers on network 26 that are authorized to receive data from network 22). The gateway then uses the appropriate public key to encrypt its own decryption key for transmission in a data packet to computer 58. Upon receiving this packet, computer 58 uses its private key to decrypt the decryption key transmitted by gateway 52, and may then use the decryption key to decrypt the data. Alternatively, the decryption key may be conveyed from gateway 52 to computer 58 via secure channels outside network 26, as noted above in regard to gateway 24.

Although the embodiments described above refer to the specific network configurations of systems 20 and 50, the principles of the present invention may be applied for suppression of malicious traffic among other arrangements of transmitters and receivers. All such alternative arrangements are considered to be within the scope of the present invention. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A computer-implemented method for protecting a private computer network, comprising:
   providing a private protected computer network;
   receiving at a gateway between a public network and the private protected computer network, data transmitted from a source address outside the private protected network over the public network, for delivery to a destination on the private protected computer network;
   encrypting the data at the gateway using an encryption key, selected in a pseudo random process, when the data is received, from a set of one or more keys that are not available to the source address;
   transmitting the encrypted data over the private computer network toward the destination;
   receiving the transmitted encrypted data, and decrypting the data for use at the destination by means of a corresponding decryption key; and
   conveying the corresponding decryption key to the destination over the private computer network together with at least a portion of the encrypted data,
   wherein conveying the decryption key comprises transmitting the decryption key in the clear to the destination, together with at least a portion of the encrypted data.

2. The method according to claim 1, wherein encrypting and transmitting the data are performed automatically, without intervention by a human operator.

3. The method according to claim 1, wherein receiving the data comprises receiving a data packet comprising a header and a payload, and wherein encrypting the data comprises encrypting both the header and the payload, and
   wherein conveying the encrypted data comprises encapsulating the encrypted header and payload in another packet for transmission over the computer network.

4. The method according to claim 1, wherein conveying the decryption key comprises sending the decryption key together with at least the portion of the encrypted data in a single data packet.

5. The method according to claim 1, wherein conveying the decryption key comprises waiting for a selected delay period between transmitting the encrypted data and transmitting the decryption key to the destination.

6. The method according to claim 1, and comprising, upon decrypting the data, checking the data for malicious content,
   wherein decrypting the data comprises separately decrypting each of a sequence of segments of the encrypted data, and wherein checking the data comprises verifying each segment in the sequence to ensure that the segment does not contain the malicious content before proceeding to decrypt succeeding segments in the sequence.

7. A computer-implemented method for protecting a private protected computer network, comprising:
   receiving at a gateway between a public network and a private protected computer network, a first data packet, comprising a header and a payload, transmitted from a source address outside the private protected network for delivery to a destination on the private computer network;

encrypting, by the gateway, at least the header of the first data packet, thereby generating an encrypted data packet;

encapsulating, by the gateway, the encrypted data packet in a second data packet, and transmitting the second data packet over the private computer network toward the destination;

transmitting a decryption key suitable for decrypting the encrypted data packet in the clear together with at least a portion of the encrypted data, from the gateway to the destination over the private computer network; and receiving and processing the transmitted second data packet so as to decapsulate and decrypt the first data packet for use at the destination.

8. Apparatus for protecting a computer network, comprising:

a gateway between a public network and a private protected computer network, which is configured to receive data transmitted from a source address outside the private protected network, for delivery to a destination on the private computer network, and to encrypt the data using an encryption key selected in a pseudo random process, when the data is received, from a set of one or more keys that are not available to the source address, encrypting the data using the key, to transmit the encrypted data over the private computer network toward the destination, to convey a decryption key corresponding to the encrypted data to the destination in the clear over the private computer network together with at least a portion of the encrypted data; and a receiver, which is configured to receive the transmitted encrypted data, and to decrypt the data for use at the destination by means of one of the keys in the set.

9. A computer-implemented method for protecting data, comprising:

receiving at a gateway data transmitted from a source within a protected computer network for delivery to a destination outside the protected computer network;

encrypting the data at the gateway using an encryption key selected from a set of one or more keys that are not available to the source or to the destination prior to receiving the data at the gateway;

transmitting the encrypted data to the destination;

receiving at the gateway, from the source, a confirmation of an authorization to transmit a decryption key, after beginning the transmission of the encrypted data to the destination; and responsively to the confirmation, conveying the decryption key suitable for decrypting the data to the destination.

10. The method according to claim 9, wherein receiving the confirmation comprises receiving an electronic signature transmitted from the source.

11. The method according to claim 9, wherein transmitting the encrypted data comprises transmitting the encrypted data over a one-way link from the gateway to destinations outside the protected computer network.

12. The method according to claim 9, wherein encrypting and transmitting the data are performed automatically, without intervention by a human operator.

13. Apparatus for protecting data, comprising:

a source computer, which is configured to be deployed in a protected computer network and to generate data for delivery to a destination outside the protected computer network; and a gateway, which is coupled to receive and encrypt the data from the source computer using an encryption key selected from a set of one or more keys that are not available to the source computer or to the destination prior to receiving the data at the gateway, to transmit the encrypted data to the destination, to receive, from the source, a confirmation of an authorization to transmit a decryption key, after beginning the transmission of the encrypted data to the destination, and responsively to the confirmation, to convey the decryption key suitable for decrypting the data at the destination.

14. The method according to claim 1, wherein encrypting the data comprises encrypting a portion of the packet and leaving a portion of the packet unencrypted.

15. The method according to claim 14, wherein the data packet comprises a plurality of headers and wherein encrypting a portion of the packet comprises encrypting at least one header of the packet and leaving at least one header unencrypted.

16. The method according to claim 1, wherein receiving the data comprises receiving previously encrypted data.

17. The method of claim 1, wherein encrypting the data comprises encrypting using an asymmetric encryption scheme.

18. The method according to claim 1, wherein the decryption key comprises the encryption key.

19. The method according to claim 1, wherein conveying the decryption key comprises transmitting the decryption key in the clear to the destination.

20. The method of claim 7, wherein encrypting at least the header of the first data packet comprises encrypting a portion of the packet and leaving a portion of the packet unencrypted.

21. The method according to claim 7, wherein the data packet comprises a plurality of headers and wherein encrypting at least the header of the first data packet comprises encrypting at least one header of the packet and leaving at least one header unencrypted.

22. The method according to claim 9, wherein the authorization to transmit the received data is received after completing the transmission of the encrypted data to the destination.

23. The method according to claim 16, wherein encrypting the data at the gateway comprises encrypting the previously encrypted data, so as to add an additional layer of encryption to the received encrypted data.

* * * * *